(12) United States Patent
Hwang

(10) Patent No.: US 7,659,032 B2
(45) Date of Patent: Feb. 9, 2010

(54) CATHODE ACTIVE MATERIAL, CATHODE MATERIAL HAVING THE CATHODE ACTIVE MATERIAL, SECONDARY AQUEOUS LITHIUM-ION BATTERY HAVING THE CATHODE MATERIAL, AND METHOD FOR PREPARING THE CATHODE ACTIVE MATERIAL

(75) Inventor: Kum-Sho Hwang, Busan-si (KR)

(73) Assignee: Saracom Co., Ltd. (KR)

( * ) Notice: Subject to any disclaimer, the term of this patent is extended or adjusted under 35 U.S.C. 154(b) by 50 days.

(21) Appl. No.: 11/779,387

(22) Filed: Jul. 18, 2007

(65) Prior Publication Data

US 2008/0152995 A1    Jun. 26, 2008

(30) Foreign Application Priority Data

Dec. 21, 2006 (KR) .................... 10-2006-0132137

(51) Int. Cl.
*H01M 4/58* (2006.01)

(52) U.S. Cl. .................... 429/231.1; 429/221; 429/229; 429/232; 429/215; 429/217; 427/58; 252/182.1

(58) Field of Classification Search ............. 429/231.1, 429/221, 229, 232, 215, 217; 427/58; 252/182.1
See application file for complete search history.

(56) References Cited

U.S. PATENT DOCUMENTS

| | | | | |
|---|---|---|---|---|
| 4,057,678 | A | * 11/1977 | Walker, Jr. | .................. 429/247 |
| 5,288,792 | A | * 2/1994 | Buxbaum | .................. 508/108 |
| 5,358,805 | A | 10/1994 | Fujimoto et al. | |
| 6,001,507 | A | 12/1999 | Ono et al. | |
| 6,605,386 | B1 | 8/2003 | Kasamatsu et al. | |

OTHER PUBLICATIONS

Julien, C. "Electrohemical properties of disordered cathode materials", Ionics (1996), 2 (3 & 4), 169-178.*

* cited by examiner

*Primary Examiner*—Laura S Weiner
(74) *Attorney, Agent, or Firm*—Cantor Colburn LLP

(57) ABSTRACT

A cathode active material is provided, having $d\text{-MoS}_2(\text{FeS}_2, \text{ZnS})$ A cathode material is provided, including the cathode active material. A method for preparing the cathode active material is provided. A secondary aqueous lithium-ion battery (LIB) is provided, including the cathode material. Accordingly, it is possible to fabricate a secondary aqueous LIB which has an excellent charge/discharge performance and improves the charge/discharge cycles.

12 Claims, 8 Drawing Sheets
(1 of 8 Drawing Sheet(s) Filed in Color)

US 7,659,032 B2

CATHODE ACTIVE MATERIAL, CATHODE MATERIAL HAVING THE CATHODE ACTIVE MATERIAL, SECONDARY AQUEOUS LITHIUM-ION BATTERY HAVING THE CATHODE MATERIAL, AND METHOD FOR PREPARING THE CATHODE ACTIVE MATERIAL

CROSS REFERENCE TO RELATED APPLICATION

This application claims the benefit of and priority from Korean Patent Application No. 2006-132137, filed on Dec. 21, 2006, which is hereby incorporated by reference for all purposes as if fully set forth herein.

BACKGROUND OF THE INVENTION

1. Field of the Invention

The present invention relates to a cathode active material which is a component of a cathode material of a secondary aqueous lithium-ion battery (LIB), and a method for preparing the same.

2. Discussion of the Background

Sony Corporation first commercialized a non-aqueous lithium ion battery (LIB) in 1991. However, lithium cobalt oxide ($LiCoO_2$), which is an anode active material constituting the non-aqueous LIB, is not appropriate to be used as an anode active material of a secondary LIB in a non-aqueous solution since its usable capacity is as low as about 150 mAh/g and Co metal costs too much.

Thus, studies have been conducted on anode active materials, such as $LiNiO_2$, $LiNi_{0.8}Co_{0.2}O_2$, $LiMnO_2$, and $V_2O_3$, as a substitute for $LiCoO_2$. Dahn et al. and Delmas et al. have recently focused on the research and development of new anode active materials using $Li_2MnO_3$, $Li[Ni_{1/2}Mn_{1/2}]O_2$, $LiNiO_2$, and $LiCoO_2$.

The anode and cathode materials of the secondary non-aqueous LIB so far reported through the studies should demonstrate the charge/discharge performances also in the aqueous solution.

Dahn et al. first developed in 1994 a secondary aqueous LIB by using $LiMn_2O_4$ as an anode active material and $VO_2$ (B) as a cathode active material. The secondary aqueous LIB has a discharge energy density of 55 Wh/kg and a discharge potential of 1.5V with charge/discharge cycles of 25 times.

Wang et al. developed a secondary aqueous LIB using $Li_2Mn_4O_9$ or $Li_4Mn_5O_{12}$ as an anode active material and $LiMn_2O_4$ as a cathode active material. The secondary aqueous LIB has a discharge capacity of 100 mAh/g and an average discharge potential of 1.1 to 1.0V. However, the secondary aqueous LIB cannot be continuously used due to gases produced during its charge/discharge processes.

Hwang developed a secondary aqueous LIB using nano-sized ZnO-coated $LiNiO_2$ as an anode active material and $Zn_xFeS_2$ as a cathode active material.

SUMMARY OF THE INVENTION

The present invention provides a cathode active material which maintains its stable structure during charge/discharge processes of a battery.

The present invention further provides a secondary aqueous lithium-ion battery (LIB) which can substantially suppress corrosion of a cathode active material.

The present invention further provides a secondary aqueous LIB having a high discharge capacity and high charge-discharge cycles.

Additional features of the invention will be set forth in the description which follows, and in part will be apparent from the description, or may be learned by practice of the invention.

The present invention discloses a cathode active material having $d-MoS_2(FeS_2, ZnS)$.

The present invention also discloses a method for preparing $d-MoS_2(FeS_2, ZnS)$ as a cathode active material, including: obtaining disordered-$MoS_2$ ($d-MOS_2$) by sintering powdered $MoS_2$; obtaining $FeS_2$ after mixing by ball-milling FeS and S and reacting FeS and S under a temperature program; obtaining a mixture of $d-MoS_2$ and $FeS_2$ after mixing by ball-milling the $d-MoS_2$ and $FeS_2$; and adding ZnS to the mixture of $d-MoS_2$ and $FeS_2$, and ball-milling the ZnS and the mixture of $d-MoS_2$ and $FeS_2$.

The present invention also discloses a cathode material including $d-MoS_2(FeS_2, ZnS)$ as a cathode active material.

The present invention also discloses a secondary aqueous lithium-ion battery including a cathode material which includes $d-MOS_2(FeS_2, ZnS)$ as a cathode active material.

It is to be understood that both the foregoing general description and the following detailed description are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawings will be provided by the Office upon receipt and payment of the necessary fee.

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
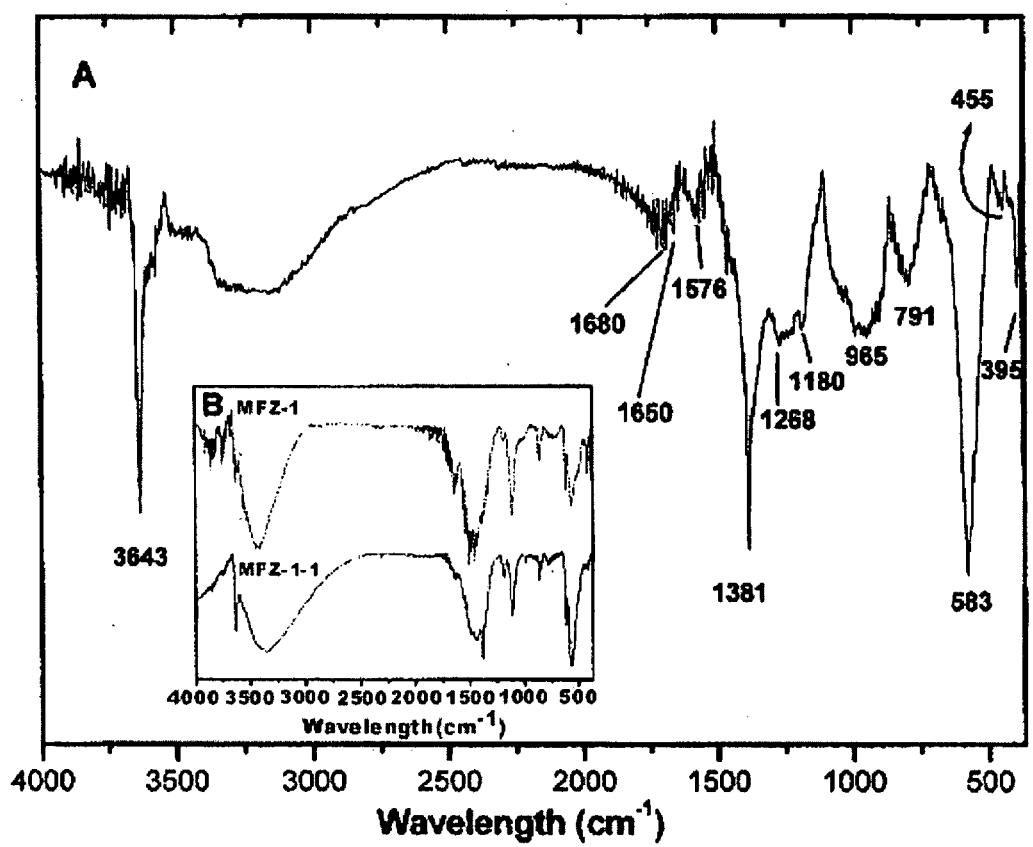
FIG. 1 illustrates an IR spectrum showing structural differences of PVdF-HFP before and after charge/discharge processes.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

1. Cathode Active Material

A cathode active material according to an exemplary embodiment of the invention is d-$MoS_2$($FeS_2$, ZnS), which is prepared by adding $FeS_2$ and ZnS to a sulfur compound with transition metal of Group 5 or 6, such as $NbS_2$, $TaS_2$ or $MoS_2$, or a selenium compound with transition metal of Group 5 or 6, such as $NbSe_2$, $TaSe_2$ or $MoSe_2$.

Among the sulfur compounds or selenium compounds with the transition metal, $MoS_2$ is preferable since $MoS_2$ is the least transformed in its crystal structure even though $H^+$ and $Li^+$ ions are inserted into or extracted from the cathode active material. Besides, $MoS_2$ maintains its stable layered structure by van der Waals' forces even though $H_2O$ passes through between layers.

A method for preparing d-$MoS_2$($FeS_2$, ZnS) will be described in detail.

First, $MoS_2$, which is commercially available, was pressed into pellets under a pressure of about 8500 to 9000 psi for about 3 to 5 minutes. The pellets were sintered at about 400° C. for 4 hours. The temperature was then gradually lowered down to room temperature, thereby obtaining irregularly disordered-$MoS_2$ (d-$MoS_2$).

The d-$MoS_2$ is transformed in its grain size and unit cell volume, and is not uniform in gaps between its layers. Therefore, when an alkaline aqueous electrolyte, such as KOH and LiOH, is used, a positive ion with a large ion size, such as $K^+$, cannot exist between the layers of d-$MoS_2$ during the charge/discharge processes, but a positive ion with a small ion size, such as $H^+$ or $Li^+$, can exist. It can be seen from the X-ray results of d-$MoS_2$ that a strong 12 Å-line (C-axis) appears among lattice constants. Therefore, it can be seen that the d-$MoS_2$ exists as a compound containing $H_2O$ having $H^+$ ion with a very small ion size.

The compound $FeS_2$ contained in the cathode active material can be obtained as follows.

First, FeS was pulverized to powder and filtered, was put in a magnetic porter together with sulfur, and was ball-milled, with the magnetic porter closed, for two days under argon gas atmosphere in a glove box, thereby obtaining an ash-colored sample attached to the inner wall of the magnetic porter in the glove box.

The sample was put into a pyrex tube, and the pyrex tube was sealed with a para film and was made vacuous ($5 \times 10^{-5}$ to $1 \times 10^{-6}$ torr). After that, the sample was reacted under a regulated temperature program. That is, the sample was reacted for two is days under a temperature of 190 to 200° C. The sample was taken out of the pyrex tube, was pulverized to powder in a mortar, and was put back into the pyrex tube. The pyrex tube was sealed with the para film and was made vacuous ($5 \times 10^{-5}$ to $1 \times 10^{-6}$ torr). Next, the powder sample was reacted for three days under a temperature of 270 to 280° C.

As a result, the pyrex tube was put and broken in the argon gas-filled glove box, and $FeS_2$ was taken out of the pyrex tube.

The powdered d-$MoS_2$ and $FeS_2$ were mixed together in the glove box filled with argon gas and were ball-milled for three hours. The powdered $FeS_2$ preferably has 10 to 40 wt % based on the weight of d-$MoS_2$. The powdered $FeS_2$ with less than 10 wt % makes it difficult to analyze the lattice structure of $FeS_2$ by X-ray diffraction (XRD). The powdered $FeS_2$ with more than 40 wt % makes it difficult to suppress corrosion of $FeS_2$.

Subsequently, electrical energy was externally supplied to the powdered ZnS and conductive mesocarbon microbeads ($McMB_{25-28}$ mfd. by Osaka Gas Co. Ltd.), of which total concentration is 10 wt %, in the glove box filled with the argon gas so that the cathode materials and binders can function properly during the charge/discharge processes and the mesocarbon microbeads can be mixed well with the cathode materials. The powdered ZnS has less than 1.0 wt % based on the weight of $FeS_2$. The powdered ZnS suppresses corrosion of $FeS_2$, and suppresses generation of gases in the aqueous solution during the charge/discharge operations by binding with glycine added to the cathode material.

Subsequently, the above-mentioned powders were ball-milled for three hours to obtain the nano-sized cathode active material, d-$MoS_2$($FeS_2$, ZnS)

2. Cathode Material

A cathode material according to an exemplary embodiment of the present invention includes 80 wt % cathode active material, 10 wt % conductive material, 8 wt % binder, and the remaining amount of additive.

The conductive material is preferably selected from, but not limited to, acetylene black and mesocarbon microbeads.

Examples of the binder include polyvinylidene fluoride (PVdF), polyvinylidene fluoride-hexafluoropropylene (PVdF-HFP), polytetrafluoroethylene (PTFE), polyvinylidene fluoride, and their derivatives, or a combination thereof. Among these, polyvinylidene fluoride-hexafluoropropylene (PVdF-HFP) is preferable since it acts properly as a binder despite a strong energy due to the charge/discharge processes.

The increased amount of $F^-$ ions in the binder causes the electrode to be more porous, such that more energy is accumulated in the electrode. Furthermore, since PVdF-HFP is formed in a helix structure, $Li^+$ and $H^+$ ions are easy to move. That is, HFP does a molecular motion by the energy applied during the charge/discharge processes, which is assumed to facilitate the movement of $Li^+$ and $H^+$ ions and $H_2O$.

Therefore, the binder has a good charge/discharge characteristic since a new material, $FeF_2(H_2O)_4$, is produced in the cathode material. That is, $FeS_2$ existing in the d-$MoS_2$($FeS_2$, ZnS) structure corrodes fast in the alkaline aqueous solution, resulting in $Fe(OH)_3$. In addition, while doing an unstable molecular motion by a high charging energy, the PVdF-HFP binder is first combined with adjacent $H_2O$ to produce $F^-(H_2O)$.

FIG. 1 illustrates an IR spectrum of the PVdF-HFP binder which does a molecular motion by a high charging energy. In FIG. 1B, 'MFZ-1' indicates a binder which remains unchanged in its structure, and 'MFZ-1-1' indicates a binder which is changed in its structure by the charging energy during the charge/discharge processes.

Referring to MFZ-1-1 in FIG. 1B, when the charging energy is applied to the PVdF-HFP binder, the binder is presumed to do a more active helix molecular motion since the PVdF-HFP binder has the following structural formula 1:

[Structural Formula 1]

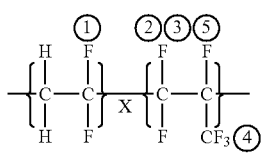

In the structural formula 1, from position ① of —{CH$_2$—CF$_2$}$_x$—, fluorine (F) is predominantly separated, which can be seen from peaks in —CF=CH$_2$ at a wavelength of 1680 cm$^{-1}$ and —CH=CF— at 1650 cm$^{-1}$ in FIG. 1A. After an activation stage, an additionally supplied charging energy causes fluorine (F) of HFP at positions ②, ② and ⑤ to be separated, which can be proved as the peaks of —CF=C(CF$_3$)— as appeared at a wavelength of 1576 cm$^{-1}$.

Figure 2:
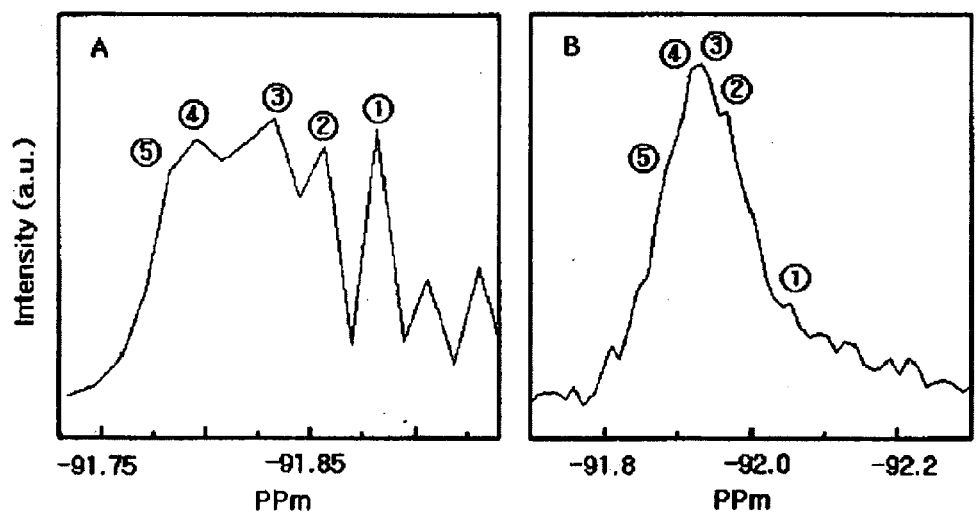
FIG. 2 illustrates an FT-NMR spectrum showing structural differences of PVdF-HFP before and after charge/discharge processes.

FIG. 2 illustrates an FT-NMR spectrum of the PVdF-HFP binder which does a molecular motion by a high charging energy.

When the charging energy is applied to the binder, fluorine (F) at position ① in the PVdF binder is separated. While the peak ① is sharp in FIG. 2A, it becomes weak long after the charge/discharge processes as shown in FIG. 2B. Therefore, it can be seen that fluorine (F) is separated mainly in the PVdF at position ① during the charge/discharge processes. As the charge/discharge processes make further progress, fluorine (F) is separated at positions ②, ③ and ⑤, which is identical to the above-mentioned IR spectrum results.

Examples of the additive include glycine (H$_2$NCH$_2$COOH), hydroxypropylmethylcellulose (HPMC), and polymethylmetacrylate (PMMA).

The additive acts as a foaming agent in the cathode material so that the cathode material can accumulate the energy therein and Li$^+$ ions and H$_2$O can move easily. When the charge/discharge processes are rapidly performed, it is inevitable that oxygen is generated on the anode and hydrogen is generated on the cathode. Therefore, it is a prerequisite for a stable electrode to minimize the generation of the gases on Ni(OH)$_2$/CdO battery or Ni(OH)$_2$/MH battery during the charge/discharge processes.

In order to minimize the generation of the gases, glycine is used as an additive. Furthermore, FeS$_2$ acts as an electrochemical catalyst in the aqueous alkaline solution, such that FeS$_2$ tends to change to Fe(OH)$_3$ easily, which suppresses the generation of oxygen. Besides, since the glycine can be used on the anode and cathode at the same time, it is possible to suppress oxygen and hydrogen gases from being generated on the anode and cathode. As a result, it is possible to obtain high energy and to suppress breakage of the electrode which is caused by the generation of the gases.

The cathode material is prepared by mixing the cathode active material, conductive material, binder and additive with the NMP solvent in the glove box filled with argon gas, performing ball-milling operations on the mixture for three hours to produce a well-mixed slurry, coating the slurry on a nickel-foam, and finally drying the slurry.

As the cathode material, a composite cathode may be used which is prepared by coating a polymer thin-film on the cathode.

In more detail, the polymer thin-film is prepared by dissolving the binder, preferably PVdF-HFP, in a solvent, which consists of a volatile solvent and a nonvolatile solvent which are mixed at a volume ratio of 3:1, in the glove box filled with argon gas, drying and eliminating a remaining nonvolatile solvent.

Subsequently, the polymer thin-film is soaked in a mixed solvent consisting of propylene carbonate and ethylene carbonate which are mixed at a volume ratio of 2:3 in which 3% LiClO$_4$ is dissolved. The resultant solution is stirred until it reaches a temperature of 110° C. When the solution is stirred so fully for about 30 minutes after the solution reaches a temperature of 95 to 105° C. that 3% LiClO$_4$ is completely dissolved in the solution, the solvent evaporates and the polymer thin-film is thus beginning to gel.

The polymer thin-film thus obtained is coated using a roll press on the cathode which is formed of the d-MoS$_2$(FeS$_2$, ZnS) slurry, thereby obtaining a cathode material coated with the polymer thin-film.

A d-MoS$_2$(FeS$_2$, ZnS) composite cathode coated with the polymer thin-film is obtained by removing the solvent remaining in the d-MoS$_2$(FeS$_2$, ZnS) coated with the polymer thin-film using a vacuum oven and by soaking the d-MoS$_2$(FeS$_2$, ZnS) in diethylether for about five minutes.

3. Anode

An anode active material according to an exemplary embodiment of the present invention is prepared by coating 0.1 to 1 wt % Al$_2$O$_3$, ZrO$_2$, MgO, ZnO or SnO$_2$ on LiNiO$_2$ to enhance the charge/discharge characteristics and to have the stable structure of the anode active material.

A method for preparing an anode material will be described in detail.

First, zinc acetate is coated on LiNiO$_2$ separately taken from a glove box filled with argon gas. That is, the LiNiO$_2$ is dissolved in an aqueous solution in which zinc acetate is dissolved, and is stirred to be mixed well. The solution with LiNiO$_2$ dissolved is put in an oven to evaporate moisture. Next, the dried sample is pulverized to powder and is pressed into pellets. The pellets are sintered in O$_2$ gas in an electric furnace and are ball-milled to obtain finely powdered LiNiO$_2$ coated with ZnO.

4. Electrolyte

An electrolyte according to an exemplary embodiment of the invention consists of 5 to 7M KOH, 1M LiOH, and 0.5M ZnO which is mixed at a volume ratio of 1:1:1 to 10:10:1.

When a low charge energy is supplied and then a high charge energy is supplied for quick-charging, passivity, such as Fe(OH)$_3$, is formed on a solid electrolyte interface (SEI). In order to remove the passivity, a cleaning process is carried out for about 20 minutes with a constant energy with a changed polarity to maintain excellent performance and charge/discharge characteristics.

Figure 3:
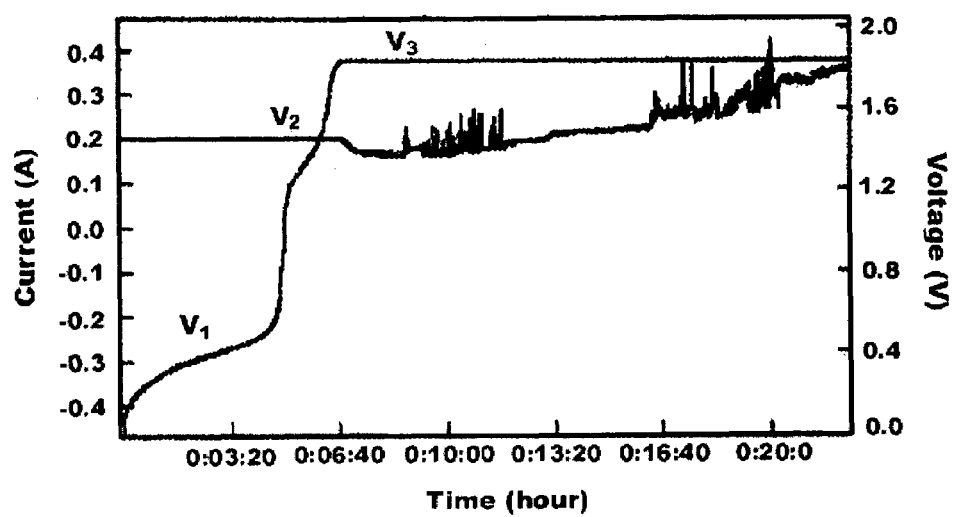
FIG. 3 illustrates potential variations with respect to time when a constant current is applied to clean a secondary aqueous lithium-ion battery (LIB) according to an exemplary embodiment of the present invention.

In the secondary aqueous LIB, the passivity formed on the cathode hinders Li$^+$ ions from moving from the aqueous solution to the electrode. FIG. 3 illustrates potential variations V$_1$, V$_2$ and V$_3$ over time when a constant current of about 100 to 200 mA is applied during the cleaning process. Since the passivity occurs on an interface between the electrode and the electrolyte during the charge/discharge processes prior to the cleaning process, an abrupt change in current occurs at stages of V$_2$ and V$_3$, which interferes with the insertion/extraction process of Li$^+$ ions on the electrode during the stages from V$_1$ to V$_3$. Thus, after the charge/discharge processes, the cleaning process needs to be carried out once.

The secondary aqueous LIB unavoidably has the passivity on the SEI layer. However, according to the present embodiment of the invention, the passivity does not have a serious effect on the secondary aqueous LIB since the SEI layer and d-MoS$_2$ can maintain their stable structures during the charge/discharge processes. In addition, the SEI layer and d-MoS$_2$ accumulate the energy during the charge/discharge processes so that a new active material, FeF$_2$(H$_2$O)$_4$, can be produced in the cathode.

Reaction Mechanism of Charge and Discharge Processes

According to Ahlberg et al., (E. Ahlberg, K. S. E. Forssberg and X. Wang: "The Surface Oxidation of Pyrite in Alkaline Solution." Journal of Applied Electrochemistry 20 (1990) 1033-1039.), $FeS_2$ contained in the cathode active material, $d\text{-}MoS_2(FeS_2, ZnS)$, tends to change to $Fe(OH)_3$ in a strong alkaline solution as expressed by the following reaction equation 1:

$FeS_2 + 11H_2O \rightarrow Fe(OH)_3 + 2SO_4^{2-} + 19H^+ + 15e^-$   [Reaction equation 1]

The $SO_4^{2-}$ ion, which occurs on the cathode, is combined with K+ion from KOH used as an electrolyte to produce $K_2SO_4$. Although the oxidation mechanism of $FeS_2$ has not been fully explained up to the present, it has been known that $FeS_2$ acts as an electrochemical catalyst to suppress the generation of $O_2$ gas.

On the other hand, it is assumed that $xLi^+$ ion is extracted from the anode material, $LiNiO_2(ZnO)$, and is bound with $MoS_2(H_2O)_y$ in the cathode to produce $Li_x(H_2O)MoS_2$. Furthermore, the $Li^+$ and $H^+$ ions are expected to move through a microporous tunnel structure which is formed by the d-$MoS_2$ and the binder by the high charge/discharge current. It is assumed that $Fe(OH)_3$, which is produced on the SEI layer or inside or around the microporous tunnel structure, and $F^-(H_2O)$, which is produced from the binder, are bound with each other to produce a new active material, $FeF_2(H_2O)_4$, as expressed by the following reaction equation 2.

$Fe(OH)_3 + 2F^-(H_2O) + 3H^+ + 3e^- \rightarrow FeF_2(H_2O)_4$   [Reaction equation 2]

Therefore, it is assumed that when a high potential of more than 1.8V is applied to the second aqueous LIB, the following reaction equation 3 is established:

$LiNiO_2 + FeF_2(H_2O) \rightleftharpoons Li_{1-x}NiO_2 + Li_xFeF_2(H_2O)_4 + xe^-$   [Reaction equation 3]

The present invention will be described in more detail based on the following exemplary embodiments.

In the following embodiments, the X-ray diffraction (XRD) system, which is a Philips X'Pert MPD system, and the electron probe micro analyzer (EPMA)-1600, manufactured by Shimadzu Corporation, are used to confirm the synthesis and structural characteristics of electrode active materials. The WBCS 3000, manufactured by Wonatech Co., is used to test the charge/discharge performance and electrochemical characteristics of the battery. In addition, FT-NMR (JUM-ECP 400, Jeol) and FT-IR (Spectrum 2000, Perkin-Elmer) are used to examine the structural variations of PVdF-HFP contained in the cathode active material after dissolving in DMSO (Dimethylsulfoxide) the cathode material separated from the cathode used before and after the charge/discharge processes.

SYNTHESIS EXAMPLE 1

Preparation of the Cathode Active Material d-$MoS_2$ ($FeS_2$, ZnS)

(1) Synthesis Process of d-$MoS_2$

The powdered $MoS_2$ (Junsei), which is commercially available, was fabricated to the round pellet type by placing it for 3 minutes under a pressure of 9000 psi. Under $N_2$ atmosphere with a constant flow rate of 0.5 ml/min, the $MoS_2$ pellets were sintered for 4 hours in an electric furnace after its temperature was gradually elevated from room temperature up to 400° C. for 2 hours. Next, the temperature of the electric furnace was gradually lowered from 400° C. down to room temperature.

Table 1 shows XRD results of the sample thus obtained. It can be seen from Table 1 that when $MoS_2$ has a grain size of 66.6 nm and a unit cell volume of 106.63 Å$^3$, the synthesized d-$MoS_2$ has a grain size of 51.4 nm and a unit cell volume of 105.98 Å$^3$. Furthermore, it can be seen from Table 1 that since the sizes of a-axis and c-axis were reduced from 3.1635 Å and 12.3035 Å to 3.1559 Å and 12.2866 Å, respectively, the d-$MoS_2$ was reduced in gaps between layers and was transformed in structure from $MoS_2$.

(2) Synthesis Process of $FeS_2$ 1 kg of FeS (Junsei) was pulverized to powder in a mortar, was filtered with a 200 mesh filter, and was dried with sulfur (S) (Junsei) at a temperature of 90° C. for 18 hours. 960 g of the dried FeS and 380 g of S were put, together with 660 balls, in a magnetic porter, and were ball-milled for two days under argon gas atmosphere in the glove box with the magnetic porter closed with a stopper. In the interim, it was turned upside down once.

The magnetic porter was put into the glove box and the sample was taken out of it. While the stopper and the surface of the ball were black, the sample sticking to the inner wall of the magnetic porter was tinged with dark grey. After 150 g of the sample pulverized to powder by the mortar was put in a pyrex tube, the pyrex tube was sealed with a para film and was made vacuous ($5 \times 10^{-5}$ torr). Next, the pyrex tube was reacted for two days at a temperature of 197° C. under the temperature program. At this time, vapor in colors ranging from yellow and light red was generated, and then disappeared except around the central portion of the wall as time elapsed.

After the pyrex tube cooled down, the circumference of the pyrex tube was cut with a diamond knife and was put in the glove box. After the pyrex tube was broken in the glove box, the sample was taken out and was pulverized to powder by the mortar. After about 150 g of the powdered sample was put in the pyrex tube, the pyrex tube was sealed with the para film and was made vacuous ($5 \times 10^{-5}$ torr). Next, the pyrex tube was reacted for three days at a temperature of 270° C. under the temperature program. The temperature was changed to 283° C. while the program was in progress, when the setup temperature was a little above 270° C. and the sensor exceeded a temperature of 280° C. During the synthetic reaction, the sulfur vapor had a color of deep red. The sulfur vapor evaporated onto the top side and disappeared gradually as time elapsed.

After the synthesis process was over, the pyrex tube was moved back into the glove box and was broken. From the pyrex tube, 125 g of $FeS_2$ was taken with a yield of 80%. Table 1 shows XRD results thereof.

(3) Preparation of d-$MoS_2$($FeS_2$, ZnS)

The powdered d-$MoS_2$, which was prepared in the process (1), and the powdered $FeS_2$ of 10 wt % based on the weight of the powdered d-$MoS_2$, which was synthesized in the process (2), were mixed with each other in the glove box filled with argon gas, and were ball-milled for three hours to obtain more fine powder.

The powdered ZnS of 1.0 wt % based on the weight of $FeS_2$ and the electrically conductive mesocarbon microbeads (McMB$_{25\text{-}28}$ mfd. by Osaka Gas Co. Ltd.) were mixed with each other to be 10 wt % of the total amount in the glove box filled with the argon gas, and were ball-milled for three hours, thereby obtaining the cathode active material, d-$MoS_2$($FeS_2$, ZnS).

Figure 4:
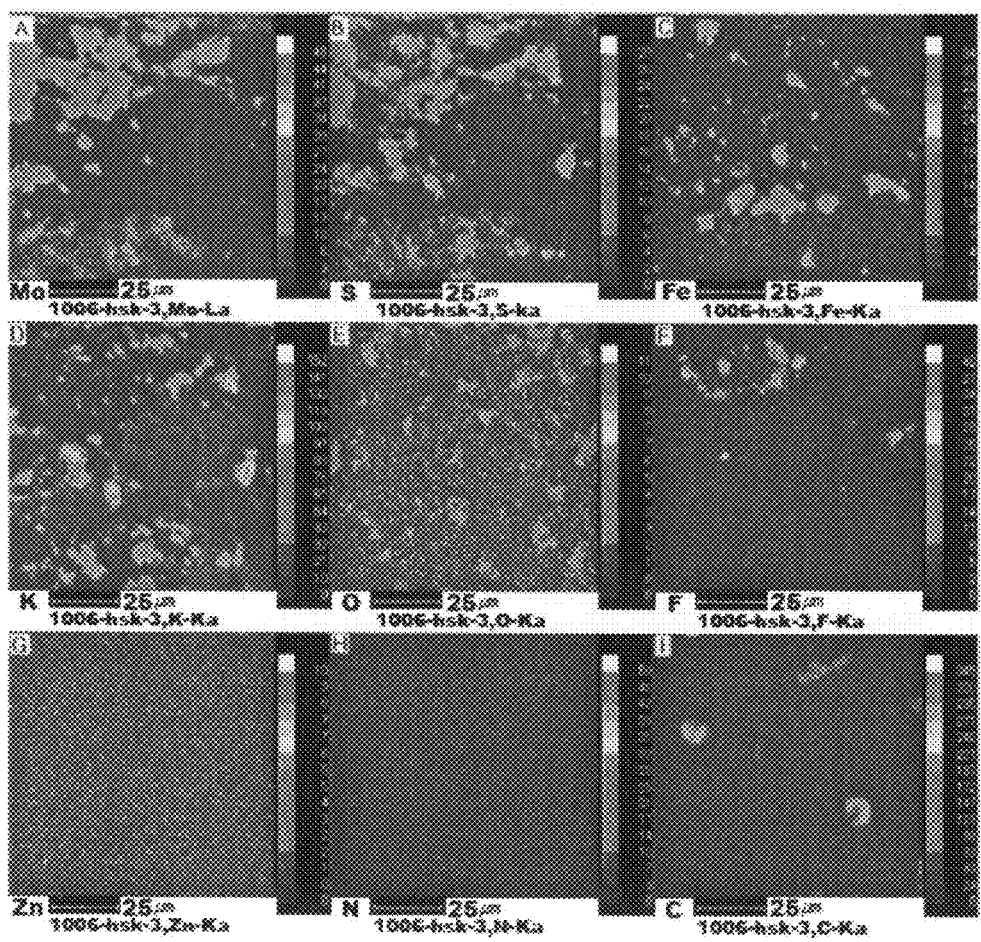
FIG. 4 illustrates a picture of a cathode active material which is obtained through EPMA after activating a secondary aqueous LIB according to an exemplary embodiment of the present invention.
Figure 5:
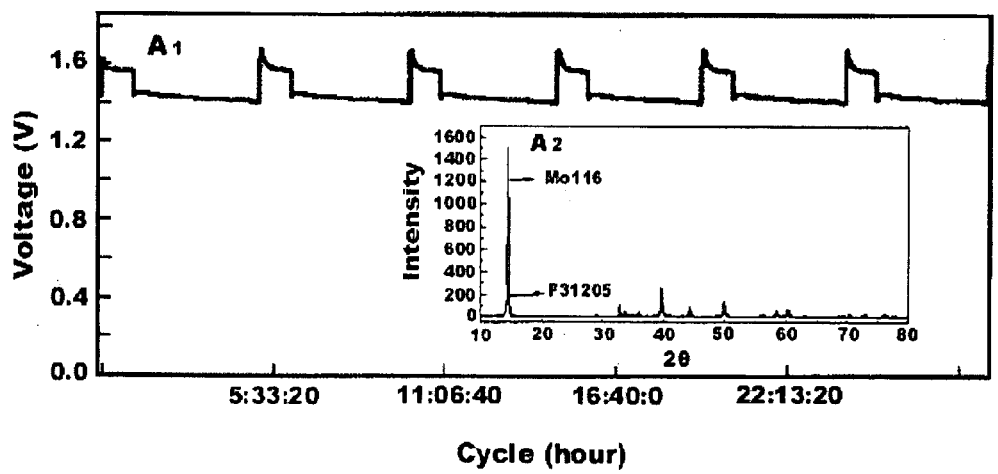
FIG. 5 illustrates a characteristic graph of a secondary aqueous LIB during its charge/discharge processes.
Figure 5:
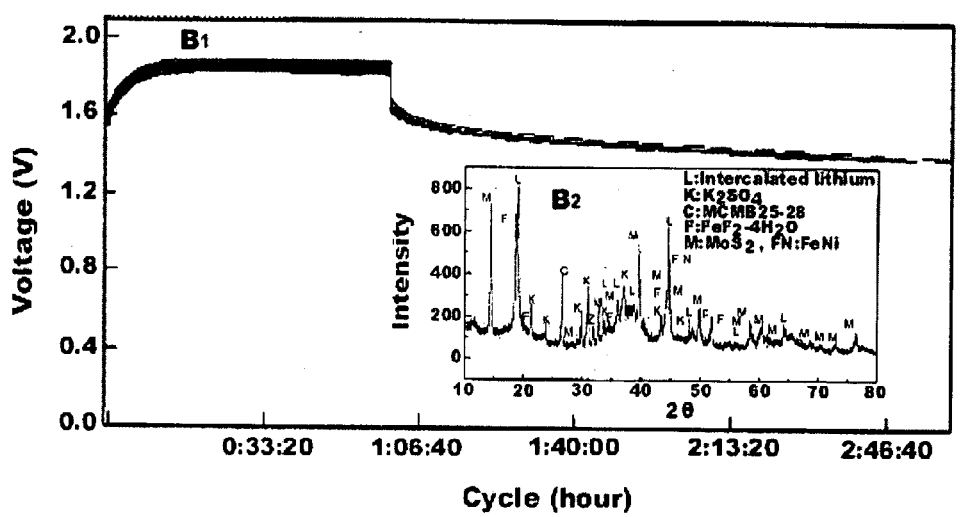

FIG. 4 illustrates EPMA results, where the cathode active material was separated from the battery to analyze variations in the cathode active material. Next, under the same charge/discharge conditions as those in FIG. 5, the variations in the cathode active material were examined while the cathode material was reacting with the electrolyte. It can be seen from FIG. 5 that after the charge/discharge processes, binding of Mo and S constituting d-$MoS_2$ remains stable. When $Fe(OH)_3$ is produced due to corrosion of $FeS_2$ (i.e., oxidation reaction) in the alkaline aqueous solution and, as shown in FIG. 5 A1, charging is performed prior to the activation, Fe is widely produced in the SEI. The reaction of the $SO_4^{-2}$ ion and the $K^+$ ion, which were produced due to the corrosion, resulted in $K_2SO_4$.

COMPARATIVE SYNTHESIS EXAMPLE 1

Synthesis Process of $Zn_xFeS_2$ 125 g of the $FeS_2$, which was synthesized in the process (2), and 1.65 g (1.3 wt %) of the powdered ZnS (Junsei) were put in a Teflon bottle, and balls were put in up to 80% of the Teflon bottle. The Teflon bottle was taken out of the glove box, and the ball milling operation was performed for three hours. After the ball milling operation, the mixed sample of $FeS_2$ and ZnS was extracted in the glove box and was put in the tube. The tube was sealed with the para film, was taken out of the glove box, and was made vacuous ($5 \times 10^{-5}$ torr). Then, the sample inside the tube was reacted at a temperature of 430° C. for 14 hours under the regulated temperature program. It was not observed that the sample inside the tube was changed in colors.

After the electric furnace was powered off and the sample cooled down, the sample was taken out of the glove box. The sample was very finely powdered $Zn_xFeS_2$ which was dark grey. Without ball milling, the amount of the sample required to fabricate the electrode was taken and a remaining amount of the sample was kept in the glove box. Table 1 shows XRD results thereof.

COMPARATIVE SYNTHESIS EXAMPLE 2

Synthesis Process of $Fe_xMoS_2$

The powdered d-MoS2, which was obtained in the synthesis example 1 (1), and the $FeS_2$ of 10 wt % based on the weight of the powdered d-$MoS_2$, which was obtained in the synthesis example 1 (2), were mixed with each other in the glove box filled with the argon gas, and were ball-milled for three hours. The mixed powders were pressed into pellets under a pressure of 9000 psi for three minutes. The pellets were immediately put in the electric furnace, and were sintered for four hours under $N_2$ atmosphere with a flow rate of 0.5 ml/min at a temperature of 400° C., thereby obtaining nano-sized $Fe_x$-$MoS_2$ which were confirmed from the XRD analysis. Table 1 shows XRD results thereof.

TABLE 1

| Cathode active material | Lattice parameter | Unit cell volume (Å$^3$) | Grain size (nm) | Structure |
|---|---|---|---|---|
| $MoS_2$ | 3.1635 | 12.3035 | 106.63 | 66.6 Hexagonal |
| d-$MoS_2$($FeS_2$,ZnS)[1] | 3.1559 | 12.2866 | 105.98 | 51.4 Hexagonal |
| d-$MoS_2$($FeS_2$,ZnS)[2] | 3.1581 | 12.2501 | 105.81 | 36.6 Hexagonal |
| $FeS_2$ | 5.4161 | — | 158.88 | 48.5 Cubic |
| $Zn_xFeS_2$ | 5.4148 | — | 158.77 | 57.0 Cubic |
| $Fe_xMoS_2$ | 3.1642 | 12.2562 | 106.27 | 29.5 Hexagonal |

(Note)
[1] before charge/discharge processes;
[2] after charge/discharge processes.

EMBODIMENT 1

A cathode material according to the embodiment 1 of the invention was prepared in slurry by mixing, in the glove box filled with the argon gas, 80 wt % d-$MoS_2$($FeS_2$,ZnS), 10 wt % acetylene black or mesocarbon microbeads ($McMB_{25-28}$ mfd. by Osaka Gas Co. Ltd.), 8 wt % polyvinylidene fluoride-hexafluoropropylene (PVdF-HFP), 1.0 wt % glycine, 1.0 wt % HPMC, and 15 ml NMP with 1.0 ml PMMA dissolved therein, and by performing ball milling operation on the mixture for three hours.

The cathode material slurry was coated on Ni-foam with 9.5 cm×4 cm and then was dried. After the cathode material slurry was uniformly coated on the Ni-foam in the air, the cathode material slurry was dried in a vacuum oven for 30 minutes to produce a cathode.

An anode was produced as follows. First, 25 g of $LiNiO_2$ (Merk) taken out of the glove box filled with argon gas was dissolved in a solution in which 0.25 g of zinc acetate (Junsei) was dissolved in 130 ml of second distilled water. The two samples were stirred by a stirrer for four hours so that the two samples can be mixed well with each other. After mixing, the mixture was dried for one day in an oven regulated at a temperature of 150° C. After the mixture was dried, the mixture was pulverized to powder and was pressed into pellets at 8600 psi for 30 minutes.

The pellets were sintered in the electric furnace at a temperature of 400° C. for one hour under $O_2$ atmosphere with a flow rate of 0.5 l/min, and were ball-milled for 12 hours, thereby obtaining finely powdered $LiNiO_2$ coated with 1 wt % ZnO.

The two electrodes, i.e., cathode and anode, were wound with a separator (polypropylene) interposed therebetween using a winding machine and were put in a nickel container. An upper portion of the nickel container was grooved by a grooving machine, and was made vacuous. Subsequently, 2 to 2.2 ml of electrolyte, which was alkaline aqueous solution consisting of 7M KOH, 1M LiOH, and 0.5M ZnO which were mixed at a volume ratio of 1:1:1, was injected into the nickel container. An insulator was put in the groove of the nickel container, a PVC closing ring was put thereon, and the nickel container was covered with a nickel cover. Next, the battery is closed by three steps using a closing machine.

A charge/discharge characteristic test was performed on the battery which was manufactured in AA size.

As shown in FIG. 5 A1, when the $LiNiO_2$(ZnO)/d-$MoS_2$ ($FeS_2$, ZnS) battery was initially charged with a constant current of 100 mA for one hour and was discharged with 2 mA, the battery was maintained at a discharge potential of 1.4V for 4 hours.

Figure 7:
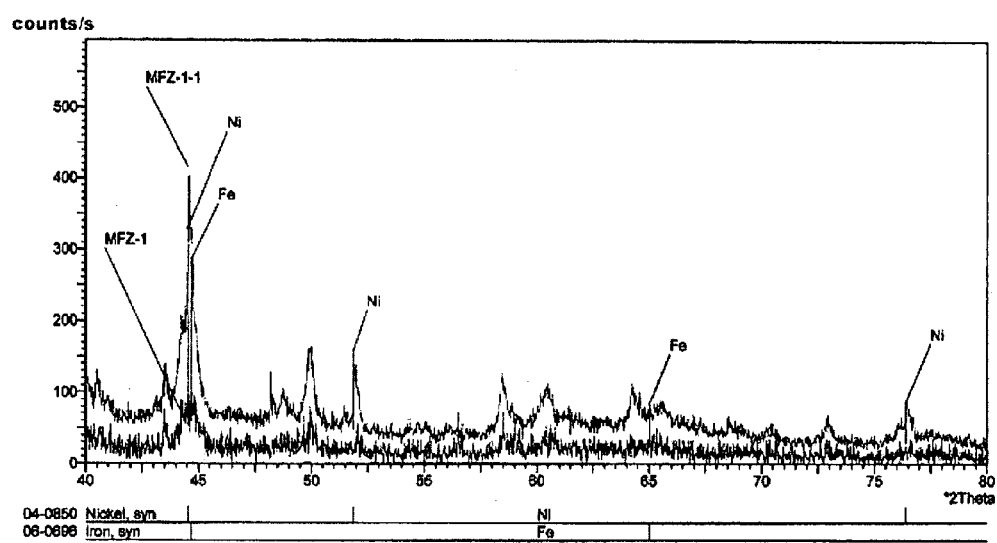
FIG. 7 illustrates X-ray results of Ni and Fe before and after charge/discharge processes.

In order to analyze magnetic characteristics of the cathode active material, a superconducting quantum interface device (SQUID; MPMS XL7) was used. As described above, $FeS_2$ corroded into $Fe(OH)_3$ in the alkaline aqueous solution. However, as shown in FIG. 5 A1, when $Fe(OH)_3$ is charged at an initial charge/discharge condition, it turns into Fe metal. It can be seen from the following results that the Fe metal is partially piled up on the Ni-foam. As shown in FIG. 7 illustrating XRD patterns of FIG. 5b2, the nickel metal has 2Θ values of 44.50°, 51.85° and 76.36°, and the Fe metal has 44.67° and 65.02°. These values are in agreement with research results of Casellanto et al.

Figure 8:
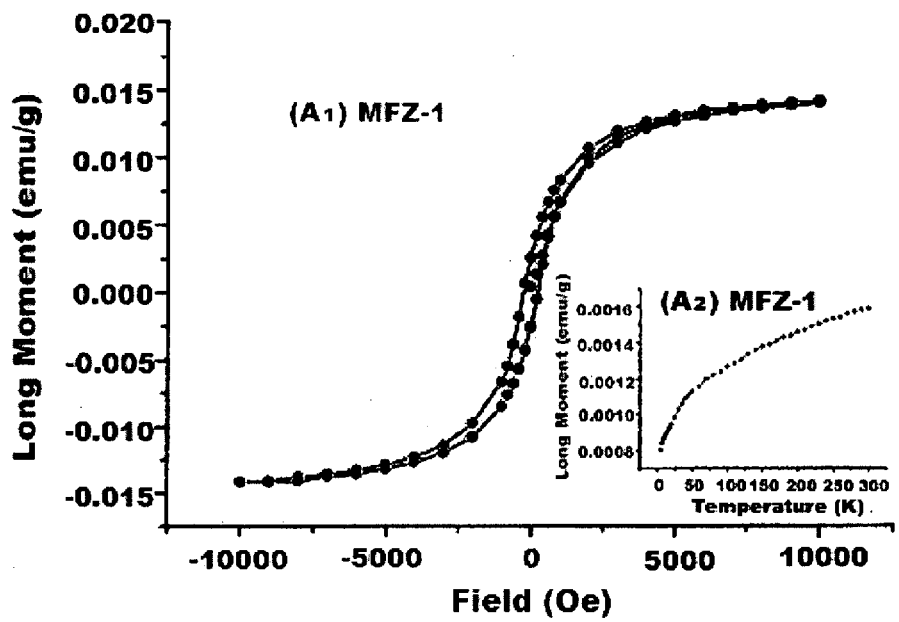
FIG. 8 illustrates magnetic characteristics of a cathode active material of Embodiment 1 of the present invention.
Figure 8:
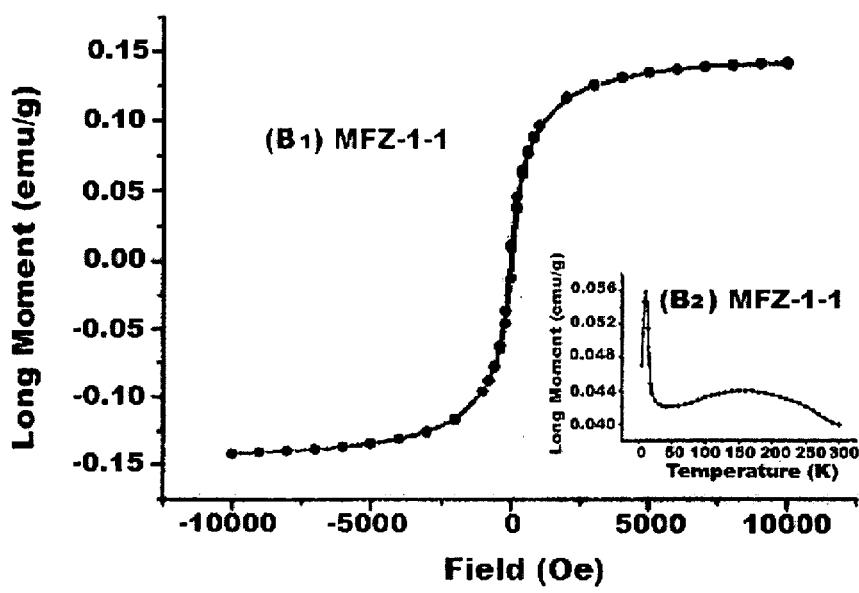

That is, it is estimated that Ni and Fe overlap with each other and $Li^+$ ions can be inserted into and extracted from binding of Ni and Fe. Like FIG. 5 A1, the charge/discharge processes are carried out from its initial state. When a charge current of 100 mA was supplied for one hour and a discharge current of 2 mA was discharged, the $Li^+$ ion existing in the binding of the overlapped metals was extracted such that the potential dropped down to 1.409V. Then, the potential instantaneously increased up to 1.4371V during the discharge cycle, since the $Li^+$ ion extracted from the bound metals substantially enhanced the magnetization degree. As shown in FIG. 8 MFZ-1, the cathode active material has a saturation magnetism Ms of 0.014 emu/g on the magnetic hysteresis curve with respect to an external magnetic field prior to the charge/discharge processes. The saturation magnetism Ms of 0.014 emu/g indicates a magnetization degree generated when all magnetic dipoles of the overlapped Ni and Fe are aligned with the external magnetic field. The residual magnetism $M_r$ and the coercivity Hc were 0.003 emu/g and 258.180 e, respectively.

However, after the charge/discharge processes (MFZ-1-1), the saturation magnetism Ms increased ten times to 0.141 emu/g, but the residual magnetism $M_r$ substantially decreased to 0.011 emu/g and the coercivity Hc has significantly decreased to 48.480 e. It can be seen from variations in peaks at temperatures of 300K and 10K in FIG. 8 A2 and B2 that the cathode active material was a diamagnetic substance prior to the charge/discharge processes but changed to a paramagnetic substance after the charge/discharge processes.

Since the paramagnetic substance acts as a desirable electrical capacitor during the charge/discharge processes, it is possible to obtain a high discharge energy and a long discharge time. These properties are considered to be very important in a process in which the battery proceeds from its initial state to its active state.

EMBODIMENT 2

A battery was manufactured in the same method as Embodiment 1 by adding 40 wt % $FeS_2$ based on the weight of $d-MoS_2$ to the $d-MoS_2$ to obtain the cathode active material. After the battery was manufactured, the battery was cleaned and the charge/discharge performance test of the battery was conducted.

As shown in FIG. 5b1, when the battery was charged with a constant current of 100 mA for an hour at the activation stage, the battery was maintained at a charge potential of 1.8V or more. After the battery was charged and then was discharged with a discharge current of 10 mA, the discharge potential of the battery showed 1.4V for two hours, with charge/discharge cycles of 150 times maintained.

Such a good charge/discharge performance is due to new substances produced in the cathode. That is, examples of the new substances include $Li^+$ ions and $H_2O$ existing in the $d-MoS_2$, $Fe(OH)_3$, which was produced from $FeS_2$ corroded in the alkaline aqueous solution, and $F^-(H_2O)$, which was produced from the PVdF-HFP binder bound with $H_2O$ by a high charge energy. It can be seen from FIG. 5b2 that $FeF_2(H_2O)_4$ was produced from the substances bound by the high charge energy which was continuously supplied. The amount of $FeF_2(H_2O)_4$ is proportional to the amount of $FeS_2$ (i.e., 10 to 40 wt %). At this time, its discharge energy density was 56 mwh/g.

When the battery was overcharged to 1.89V for 6 hours and was then discharged with a discharge current of 10 mA, two consecutive discharge processes occurred at a potential of 1.6 to 1.5V and at a potential of 1.5 to 1.4V. When the discharge potential was lowered to 1.2V, a discharge time of about 12 hours was obtained. At this time, its maximum discharge energy density was 288 mwh/g.

COMPARATIVE EXAMPLE 1

A battery was manufactured and charged/discharged in the same method as Embodiment 1, except that only $d-MoS_2$ was used as the cathode material. However, the battery having $d-MoS_2$ only did not show the performance of the secondary aqueous battery.

COMPARATIVE EXAMPLE 2

A battery was manufactured and charged/discharged in the same method as Embodiment 1, except that $Zn_xFeS_2$ (x=1.3 wt %), which was obtained in the above-mentioned comparative synthesis example 1, was used as the cathode material. The performance of the battery was compared with that of nickel-cadmium battery which is commercially available.

Figure 6:
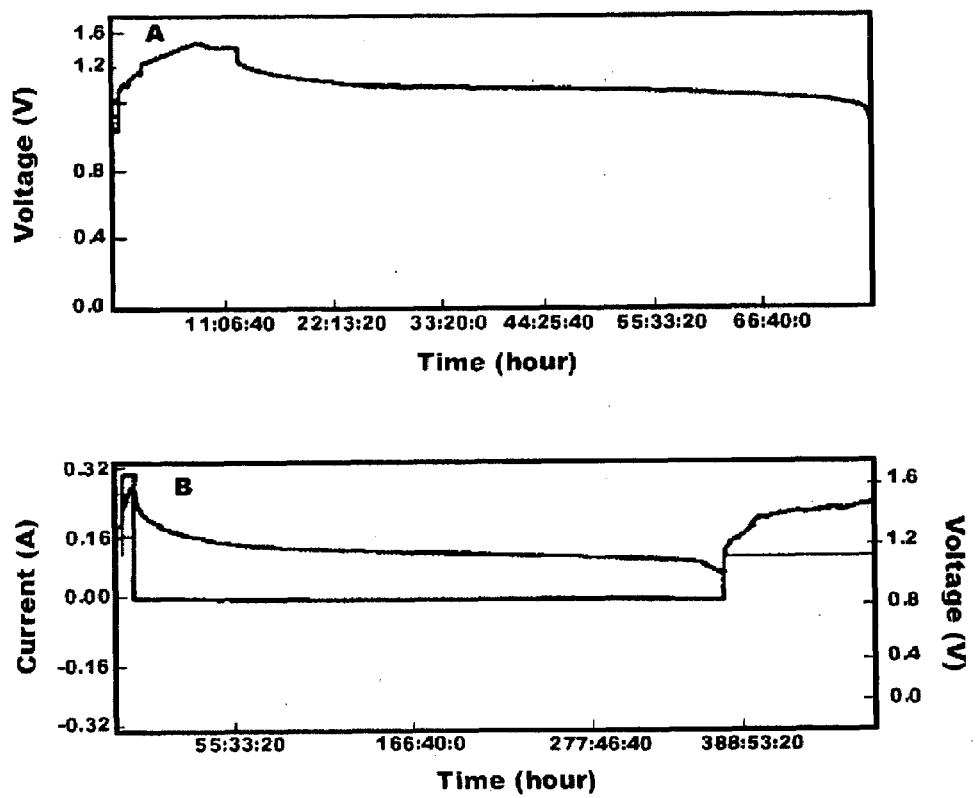
FIG. 6 illustrates a charge/discharge graph A of a Ni—Cd battery and a charge/discharge graph B of a battery of Comparative Example 2 of the present invention.

FIG. 6A illustrates charge/discharge results of the Ni—Cd battery, in which the Ni—Cd battery was charged with a constant current of 100 mA for two consecutive days and was then discharged with a constant current of 10 mA until it reached a potential of 1.0V.

When the battery was discharged down to 1.2V, its maximum discharge energy density of 76 mwh/g was obtained by measuring the amount of $Ni(OH)_2$ and the amount of CdO.

As shown in FIG. 6B, the battery of the above-mentioned comparative example 2 was activated for a long time, and was charged with a constant current of 300 mA for 3 hours. After that, the battery was discharged with a constant current of 10 mA until it reached a potential of 1.2V. At this time, its discharge energy density of 140 mwh/g was obtained, which amounts to 1.8 times that of the Ni—Cd battery. When the battery was discharged with a constant current of 10 mA until it reached 1.0V, its discharge time was 15 days and its discharge energy density was 6.3 times that of the Ni—Cd battery. However, there was a problem in that the battery demonstrated a quite poor charge/discharge performance and a poor cyclability compared with the Ni—Cd battery.

This is due to the fact that when $Zn_xFeS_2$ (x=1.3 wt %) was synthesized and Zn atom inserted into the lattice structure of $FeS_2$ was charged and discharged, removing sulfur defects in the lattice structure of $FeS_2$ was temporarily, but not basically, protected by alkaline electrolyte. Therefore, during the charge/discharge processes, the lattice structure of $FeS_2$ tended to be broken down and $FeS_2$ corroded into $Fe(OH)_3$, whereby the SEI layer of the battery was increasingly unstable and its energy storage capacity decreased remarkably.

COMPARATIVE EXAMPLE 3

A battery was produced and charged/discharged in the same method as Embodiment 1, except that $Fe_xMoS_2$, which was obtained in the above-mentioned comparative synthesis example 2, was used as the cathode material.

However, as shown in FIG. 5 A2 F31205, the battery having $Fe_xMoS_2$ as the cathode material did not show the performance of the secondary aqueous battery.

As apparent from the above description, it is possible to fabricate a secondary aqueous LIB with excellent charge/discharge performance and cyclability by using a cathode material having $d-MoS_2(FeS_2, ZnS)$ as a cathode active material.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for preparing d-$MoS_2$($FeS_2$, ZnS) as a cathode active material, comprising:
   obtaining disordered-$MoS_2$ (d-$MoS_2$) by sintering powdered $MoS_2$;
   obtaining $FeS_2$ after mixing by ball-milling FeS and S and reacting FeS and S under a temperature program;
   obtaining a mixture of d-$MoS_2$ and $FeS_2$ after mixing by ball-milling the d-$MoS_2$ and $FeS_2$; and
   adding ZnS to the mixture of d-$MoS_2$ and $FeS_2$, and ball-milling the ZnS and the mixture of d-$MoS_2$ and $FeS_2$.

2. The method of claim 1, wherein the temperature program is carried out two times at temperatures of 190° C. to 200° C. and at 270° C. to 280° C.

3. A cathode material comprising d-$MoS_2$($FeS_2$, ZnS) as a cathode active material, a conductive material, a binder, and an additive.

4. The cathode material of claim 3, wherein the cathode material comprises 10 wt. % conductive material and 8 wt. % binder.

5. The cathode material of claim 3, wherein the conductive material is selected from the group consisting of acetylene black and mesocarbon microbeads, the binder is polyvinylidene fluoride-hexamethylenepropylene, and the additive is selected from the group consisting of glycine, hydroxypropylmethylcellulose, and polymethylmetacrylate solution.

6. A secondary aqueous lithium-ion battery comprising the cathode material of claim 3.

7. The secondary aqueous lithium-ion battery of claim 6, wherein the cathode material is coated with a polymer thin-film.

8. The secondary aqueous lithium-ion battery of claim 7, wherein the polymer thin-film is prepared by dissolving a polymer resin in a first mixed solvent consisting of volatile and nonvolatile solvents, vacuum-drying the polymer resin dissolved in the first mixed solvent into a polymer thin-film, and soaking the dried polymer thin-film in a second mixed solvent consisting of PC and EC in which $LiClO_4$ is dissolved.

9. The secondary aqueous lithium-ion battery of claim 8, wherein the polymer resin is polyvinylidene fluoride-hexamethylenepropylene.

10. The cathode material of claim 3, wherein 10 to 40 wt. % of $FeS_2$ is present based on the weight of d-$MoS_2$.

11. The cathode material of claim 3, wherein 1.0 wt. % or less of ZnS is present based on the weight of $FeS_2$.

12. The cathode material of claim 3, wherein the cathode active material has 80 wt. % based on the weight of the cathode material.

* * * * *

UNITED STATES PATENT AND TRADEMARK OFFICE
CERTIFICATE OF CORRECTION

PATENT NO. : 7,659,032 B2
APPLICATION NO. : 11/779387
DATED : February 9, 2010
INVENTOR(S) : Kum-sho Hwang Page 1 of 1

It is certified that error appears in the above-identified patent and that said Letters Patent is hereby corrected as shown below:

Column 7, Line 33-34

Please replace with the following:

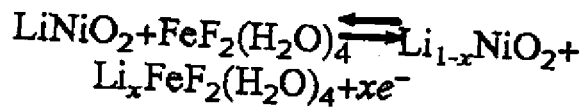

Signed and Sealed this
First Day of January, 2013

David J. Kappos
*Director of the United States Patent and Trademark Office*